(12) United States Patent
Choi et al.

(10) Patent No.: US 6,796,565 B2
(45) Date of Patent: Sep. 28, 2004

(54) CART FOR TRANSPORTATION

(76) Inventors: Jae Chul Choi, 101-707, Chumdanmoa Apt., Woigye-dong, Kwangsan-ku, Kwangju (KR); Choon Yong Choi, 601-1103, Makslong Apt., 211 Mok 5-dong, Yangchun-ku, Seoul (KR)

( * ) Notice: Subject to any disclaimer, the term of this patent is extended or adjusted under 35 U.S.C. 154(b) by 0 days.

(21) Appl. No.: 10/264,056

(22) Filed: Oct. 2, 2002

(65) Prior Publication Data

US 2004/0066012 A1 Apr. 8, 2004

(51) Int. Cl.⁷ ................................................. B62B 3/00
(52) U.S. Cl. ..................... 280/47.35; 280/35; 280/79.3; 403/292; 211/188; 211/194
(58) Field of Search ......................... 280/35, 659, 47.34, 280/47.35, 47.371, 79.11, 79.3, 79.7; 403/292, 298, 345; 211/134, 186, 188, 153, 189, 190, 194

(56) References Cited

U.S. PATENT DOCUMENTS

| | | | | | |
|---|---|---|---|---|---|
| 2,886,186 A | * | 5/1959 | Hamilton | ..................... | 108/189 |
| 4,595,107 A | * | 6/1986 | Welsch | ........................ | 211/187 |
| 4,763,799 A | * | 8/1988 | Cohn et al. | .................. | 211/187 |
| 4,852,501 A | * | 8/1989 | Olson et al. | ................. | 108/107 |
| 4,998,023 A | * | 3/1991 | Kitts | ........................ | 280/47.35 |
| 5,454,661 A | * | 10/1995 | Litvin et al. | ................. | 403/298 |
| 6,135,299 A | * | 10/2000 | Burgess | ....................... | 211/194 |
| 6,213,483 B1 | * | 4/2001 | Gaffney | .................... | 280/47.35 |
| 6,260,488 B1 | * | 7/2001 | Yang et al. | .................. | 108/107 |
| 6,547,264 B1 | * | 4/2003 | Blackburn | ............... | 280/47.35 |

* cited by examiner

Primary Examiner—Brian L. Johnson
Assistant Examiner—Brian L. Swenson
(74) Attorney, Agent, or Firm—Lee, Hong, Degerman, Kang & Schmadeka

(57) ABSTRACT

There is disclosed a cart for transportation, which includes a plurality of trays, a support for supporting the trays, a handle provided to the uppermost tray, and a wheel provided to the lowermost tray, which comprises a connecting pipe 112 attached to each corner of each of the trays 110, a supporting member 120 provided between upper and lower trays, a connecting member 130 for joining the supporting member 120 and the connecting pipe of the tray 110 with each other, a handle connecting member 140 for joining the handle 150 with the connecting pipe of the uppermost tray, and a wheel connecting member 160 for joining the wheel 170 with the connecting pipe of the lowermost tray. The invention can be assembled easily without using coupling devices and shipping charges can reduced as the volume of the components is minimized before the cart is assembled.

1 Claim, 6 Drawing Sheets

CART FOR TRANSPORTATION

BACKGROUND OF THE INVENTION

1. Field of the Invention

The present invention relates to a cart, and more particularly, to a cart for transportation, which is easily assembled.

2. Background of the Related Art

A cart is used for various purposes. Especially, it is mainly used as a means for carrying food in restaurants or hotels. The cart is widely used in America so that lots of carts produced in Korea are exported to America.

A conventional cart 1 that has been manufactured and sold in Korea and America so far, shown in FIG. 1, is constructed in a manner that a plurality of trays 10 each of which has frame wall 11, leaving only one side open, are joined with a vertical supporting member 20, which is bent at right angle, using bolts 21 and nuts. A handle 30 is also joined with the supporting member 20 using the bolt 21 by means of a handle support 31.

Accordingly, the conventional cart 1 has problems that its manufacturer should punches bolt joint holes and its importer has a cumbersome process of assembling the components of the cart using bolts 21. Furthermore, since the bolts 21 are exposed to the outside, it spoils the beauty of the cart. This deteriorates competitiveness in terms of design.

SUMMARY OF THE INVENTION

Accordingly, the present invention is directed to a cart that substantially obviates one or more problems due to limitations and disadvantages of the related art.

An object of the present invention is to provide a cart for transportation, which has a beautiful appearance and is easily assembled without having a separate tool in such a manner that components such as trays, supporting members, a handle and wheels are joined together using a connecting member having insertions formed at both ends thereof instead of bolts.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
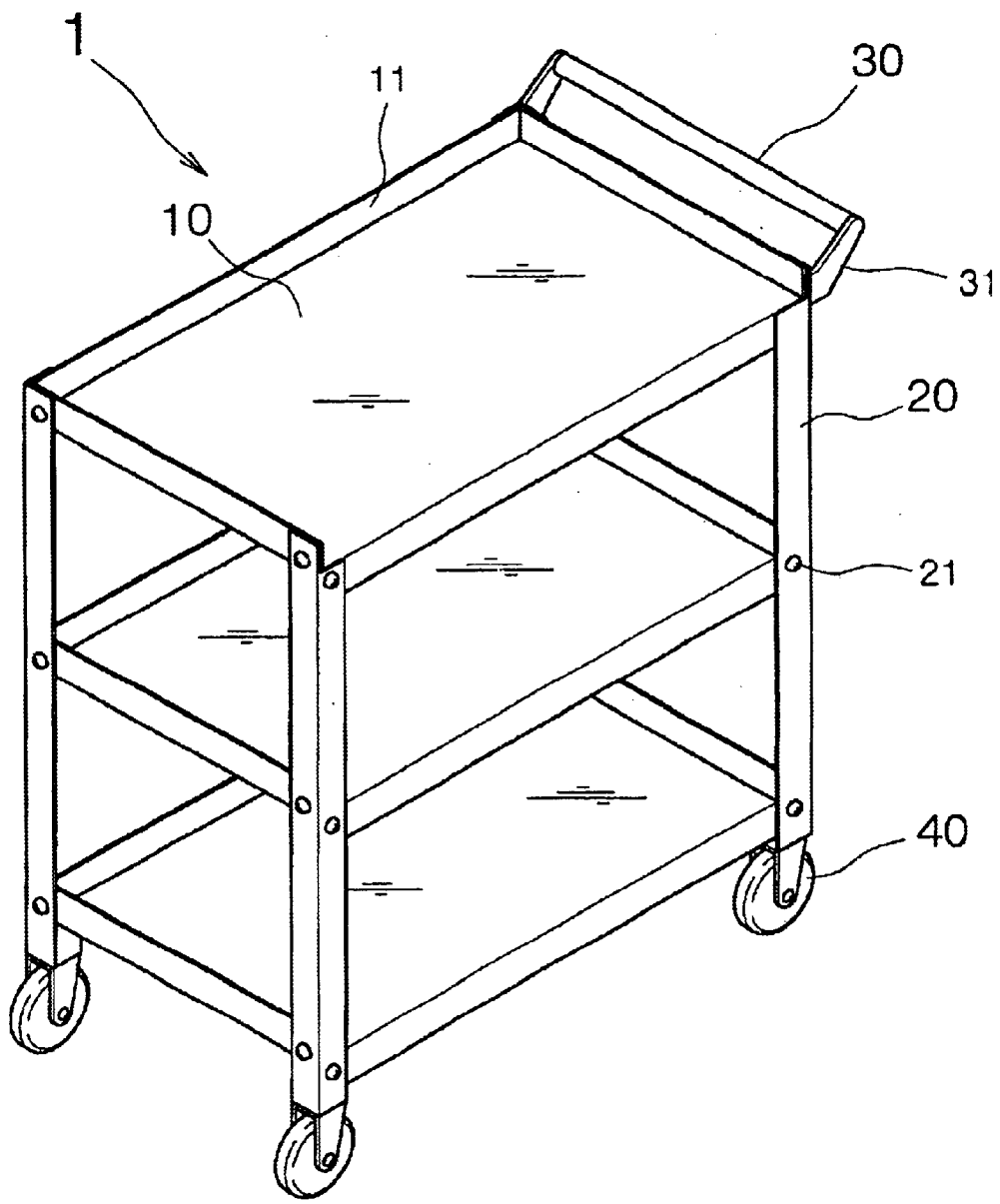
FIG. 1 is a perspective view of a conventional cart.
Figure 2:
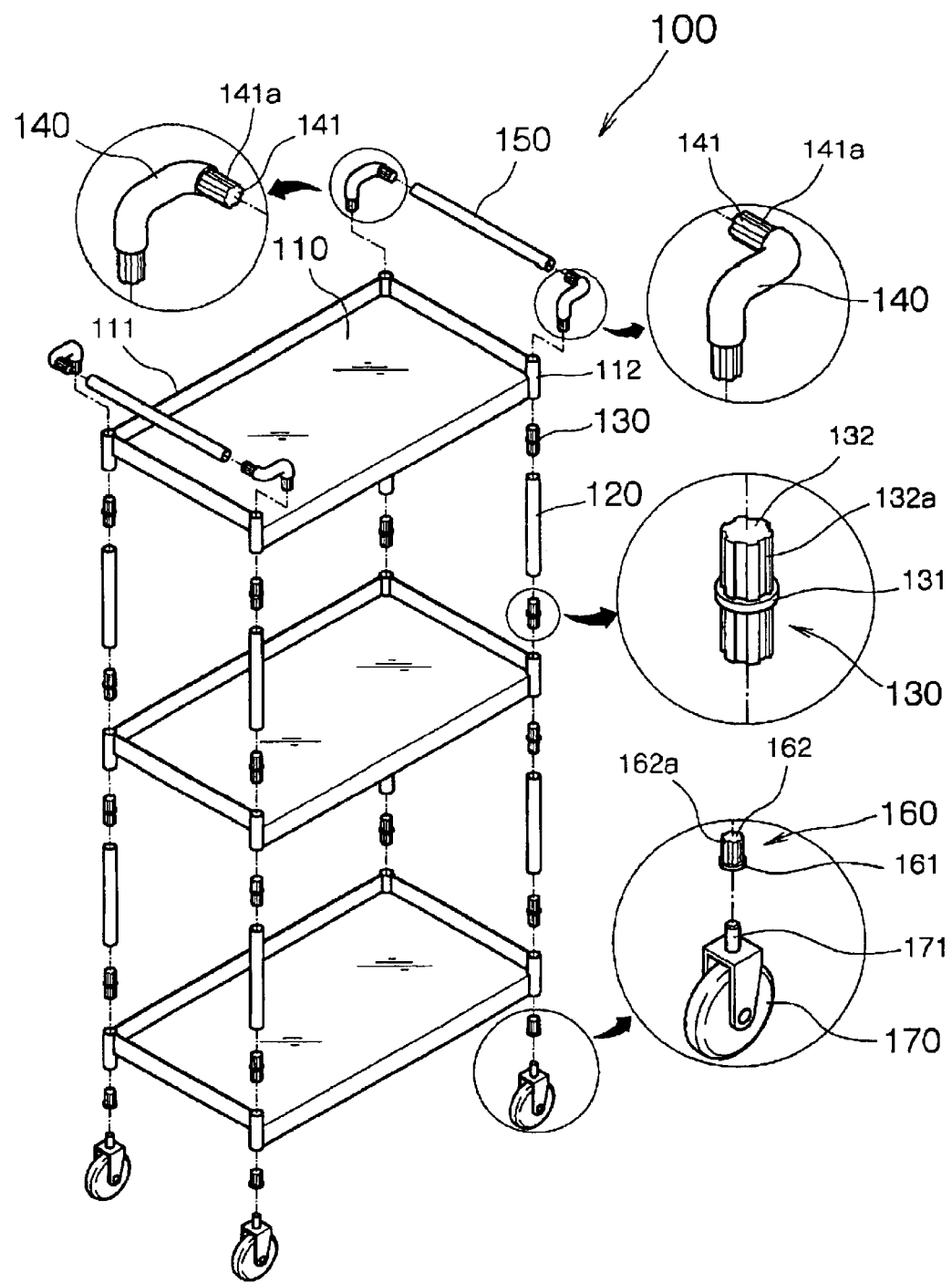
FIG. 2 is an exploded perspective view of a cart according to the present invention.
Figure 3:
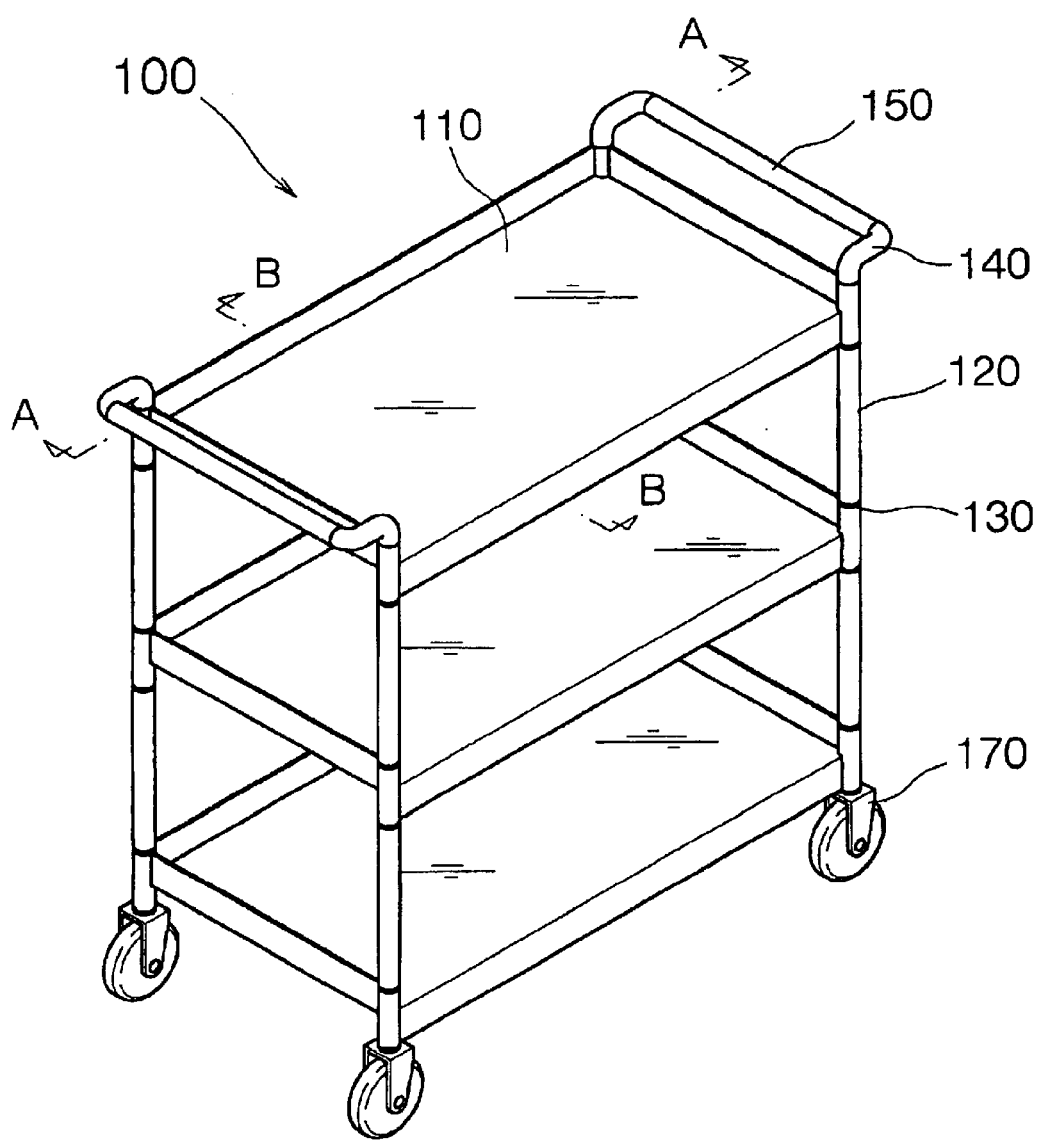
FIG. 3 is a perspective view of the assemble cart of the present invention.
Figure 4:
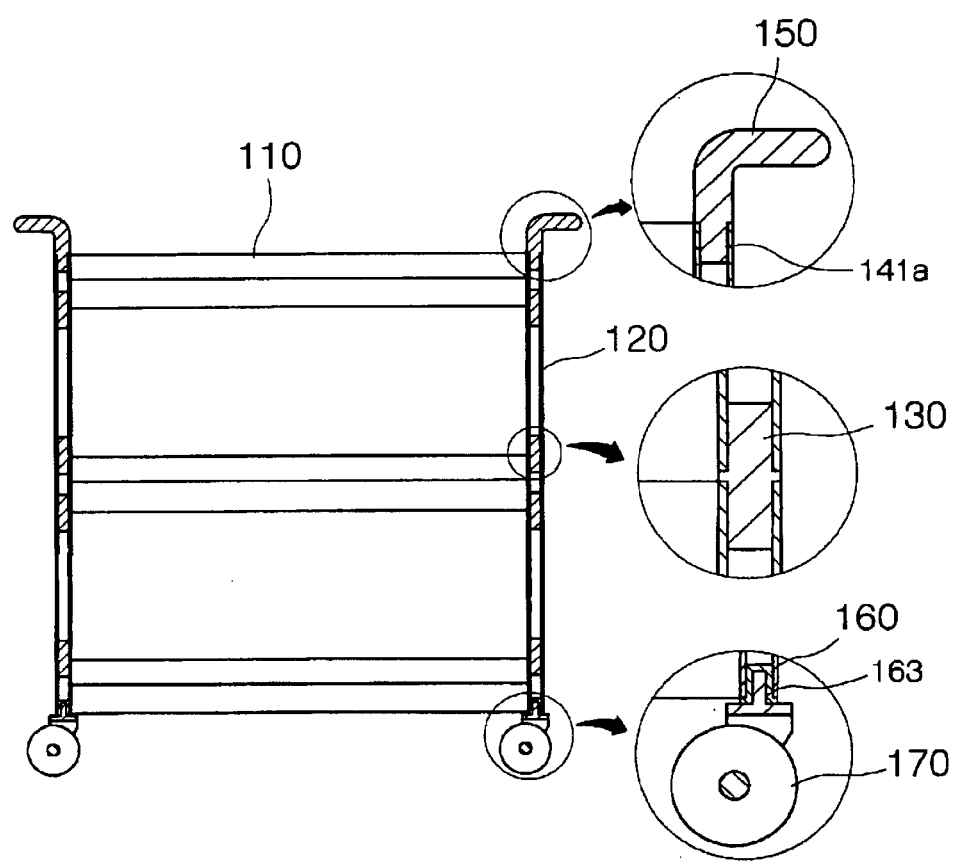
FIG. 4 is a cross-sectional view taken along the line A—A of FIG. 3.
Figure 5:
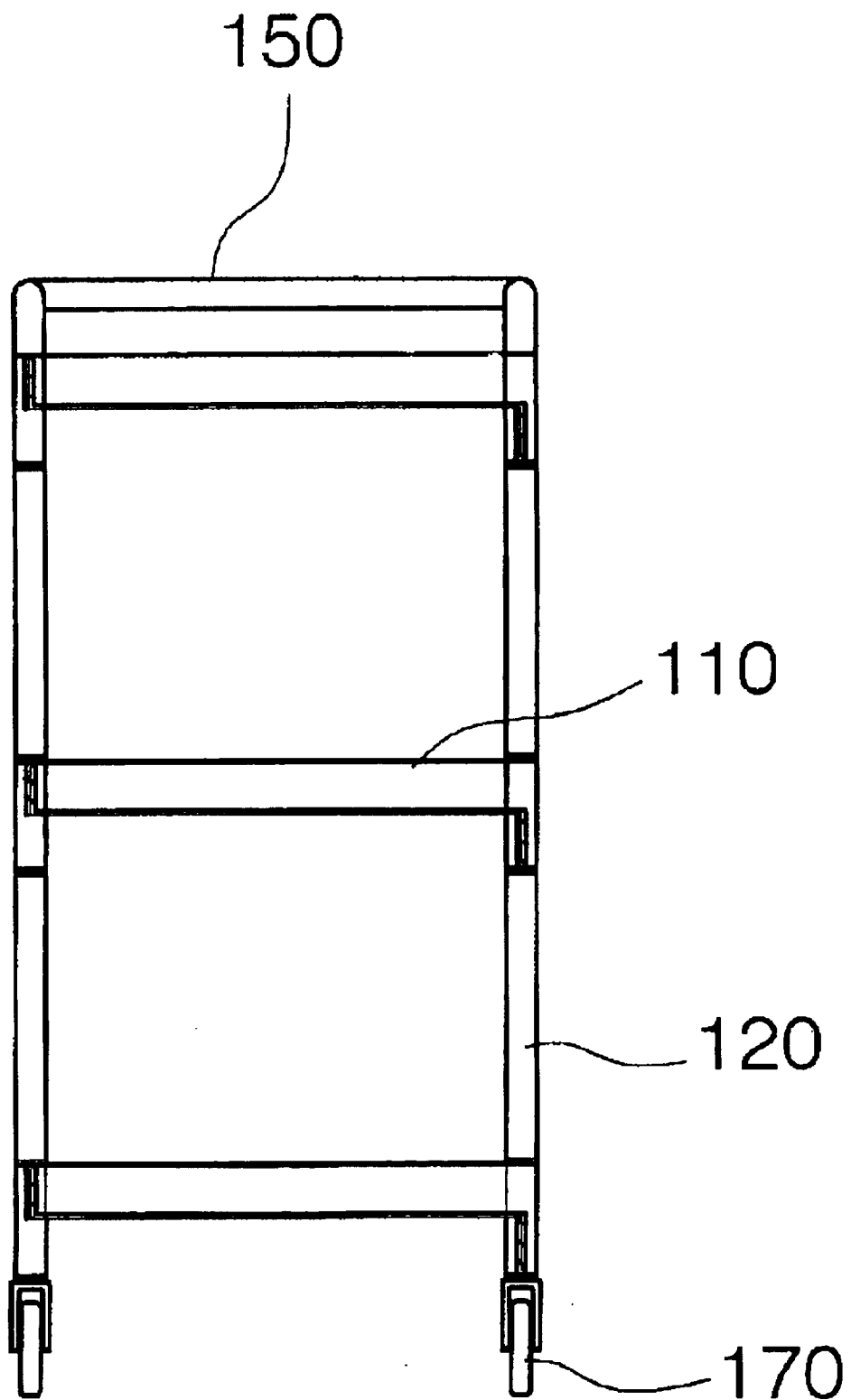
FIG. 5 is a cross-sectional view taken along the line B—B of FIG. 3.
Figure 6:
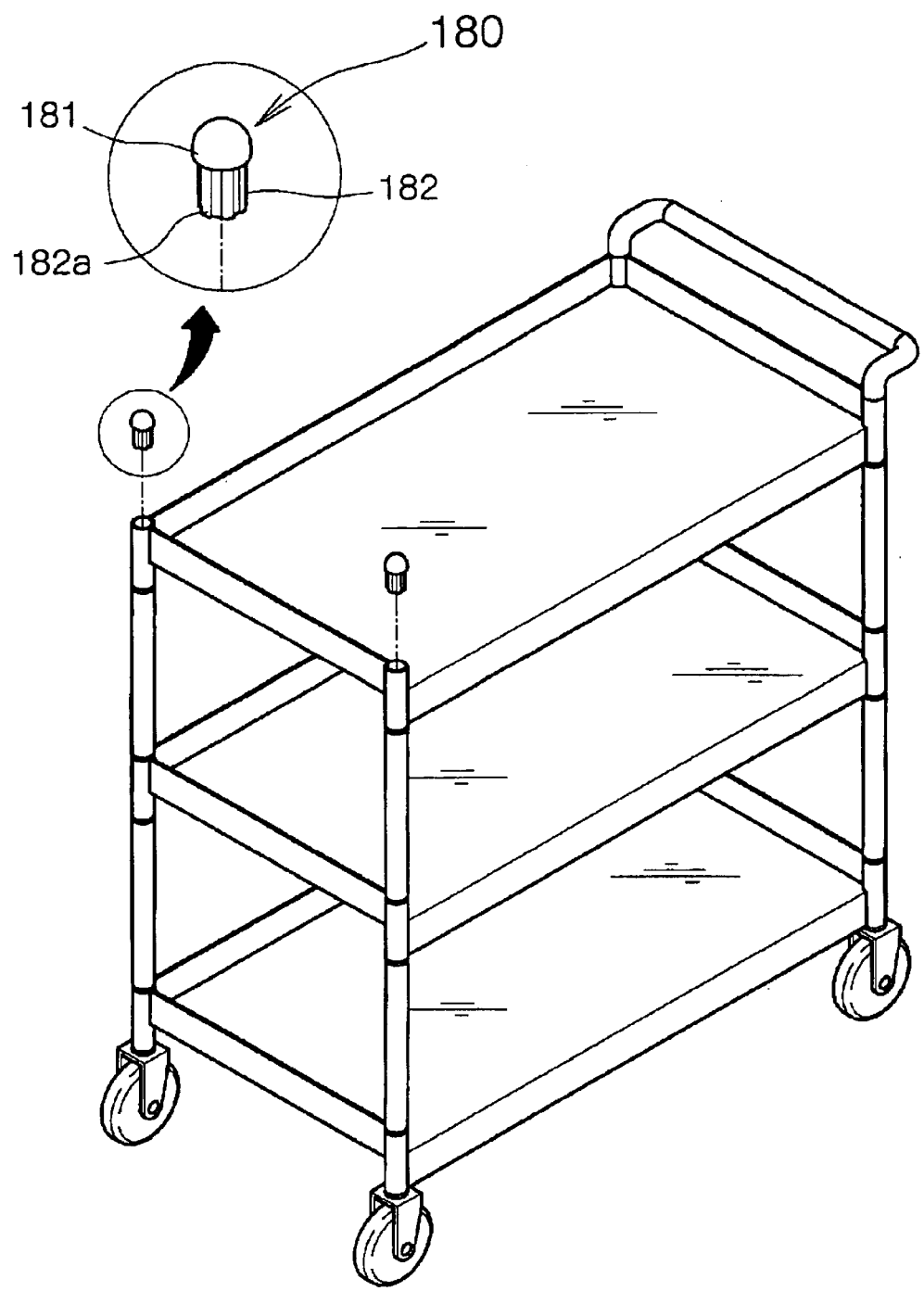
FIG. 6 is a perspective view of a cart according to another embodiment of the present invention.

FIG. 2 is an exploded perspective view of a cart of the invention. The cart 100 of the invention is constructed in such a manner that a connecting pipe 112 is attached to each corner of each of a plurality of trays 110 and a supporting member 120 for determining the height of the tray is provided between upper and lower trays 110. The supporting member 120 can be joined with the connecting pipe 112 of the tray 110 using a connecting member 130. Each of the trays 110 has a frame wall 111, leaving only one side open. The connecting pipe 112 has a height corresponding to the thickness of the tray.

The connecting pipe 112 is attached to each corner of the tray 110 such that the height of the connecting pipe nearly corresponds to the thickness of the tray. Here, the tray is surrounded by the frame wall 111, leaving one side open, as is the conventional tray.

The supporting member 120 for determining the height of the tray is provided between upper and lower trays 110 and joined with the connecting pipe 112 attached to the tray 110 by means of the connecting member 130.

The connecting member 130 includes a ring-shaped stopper 131 protruded from the center portion thereof, and an insertion 132 placed at both sides of the stopper. The insertion 132 has a plurality of projections 132a formed on the surface thereof. Once the connecting member 130 is inserted into the connecting pipes 112 located above and under the connecting member, it is not easily separated from the connecting pipe because of the projections 132a. That is, the insertion 132 is inserted into the connecting pipe 112, with the projections 132a being pressed, so that the connecting member 130 joined with the connecting pipe 112 in this manner cannot easily separated from the connecting pipe. This is needed for secure assembling of the cart 100 of the invention. Accordingly, it is preferable that the connecting member 130 is made of plastics.

The handle 150 of the cart is joined with the top of the connecting pipe 112 of the uppermost tray 110 using a handle connecting member 140. The handle 150 has a straight pipe shape. One end of the handle connecting member 140 is bent in horizontal direction and its other end is bent in vertical direction. Here, while the handle connecting member 140 must be bent for joining the handle with the cart, a bent angle of the handle connecting member is not limited to a specific value because it can be decided in consideration of the design of the cart and convenience of its user.

An insertion 141 is formed at both ends of the handle connecting member 140 and it has a plurality of projections 141a formed on the surface thereof. When the handle connecting member 140 is joined with the handle 150 and the connecting pipe 112, the projections 141a prevents the handle connecting member from being easily separated from the handle 150 and the connecting pipe 112 as does the projections 132a of the connecting member 130. Accordingly, the handle connecting member 140 is also preferably made of plastics.

The handle 150 can be provided to both sides of the top of the cart 100 of the invention. Otherwise, only one handle can be provided if required. In this case, a cap 180 is put on the connecting pipe 112, placed at the side to which the handle is not provided, for beautiful appearances of the cart. The cap 180 includes a hemispheric stopper 181 provided to the upper part thereof and an insertion 182 that has a plurality of projections 182*a* and is provided to the lower part thereof.

A wheel 170 of the cart of the invention is joined with the connecting pipe 112 attached to the lowermost tray of the cart using a wheel connecting member 160. Specifically, the wheel connecting member 160 is inserted into the connecting pipe 112 of the lowermost tray and the wheel 170 is joined with the wheel connecting member 160.

The wheel connecting member 160 has a ring-shaped stopper 161 formed at the bottom thereof and an insertion 162 having a plurality of projections 162*a* formed on its surface. The insertion 162 is placed on the stopper. In addition, a protrusion insertion hole 163 into which a connecting protrusion 171 of the wheel is inserted is formed at the center of the bottom of the wheel connecting member 160.

As described above, the cart of the invention can be easily assembled without using fasteners such as bolts and tools. Furthermore, the present invention provides the cart that has beautiful appearances while having secure structure after assembled. Moreover, the volume of components of the cart is minimized before the cart is assembled. Accordingly, transport cost can be reduced by shipping the components not the accomplished cart.

What is claimed is:

1. A transportation cart having a plurality of stacked trays, each tray having a plurality of corners and supported by a plurality of supports, a handle disposed on an uppermost tray, and a plurality of wheels disposed on a lowermost tray, the cart comprising:

a connecting pipe attached to each corner of each tray;

a supporting member disposed between the trays;

a connecting member for fastening the supporting member to the connecting pipe, wherein the connecting member comprises:
  a circular stopper having upper and lower sides;
  an insertion member having a center and extending from the upper and lower sides of the circular stopper; and
  a plurality of vertical projections radiating from the center of the insertion member;

a handle connecting member for fastening the handle to the connecting pipe of the uppermost tray, wherein the handle connecting member comprises:
  a stopper having first and second ends, wherein the first end is formed vertically and the second end is formed horizontally;
  an insertion member having a center and extending from the first and second ends of the stopper; and
  a plurality of vertical projections radiating from the center of the insertion member; and a wheel connecting member for fastening the wheel to the connecting pipe of the lowermost tray, wherein the wheel connecting member comprises:
  a circular stopper; and
  an insertion member having a center and extending from the circular stopper.

\* \* \* \* \*